United States Patent Office.

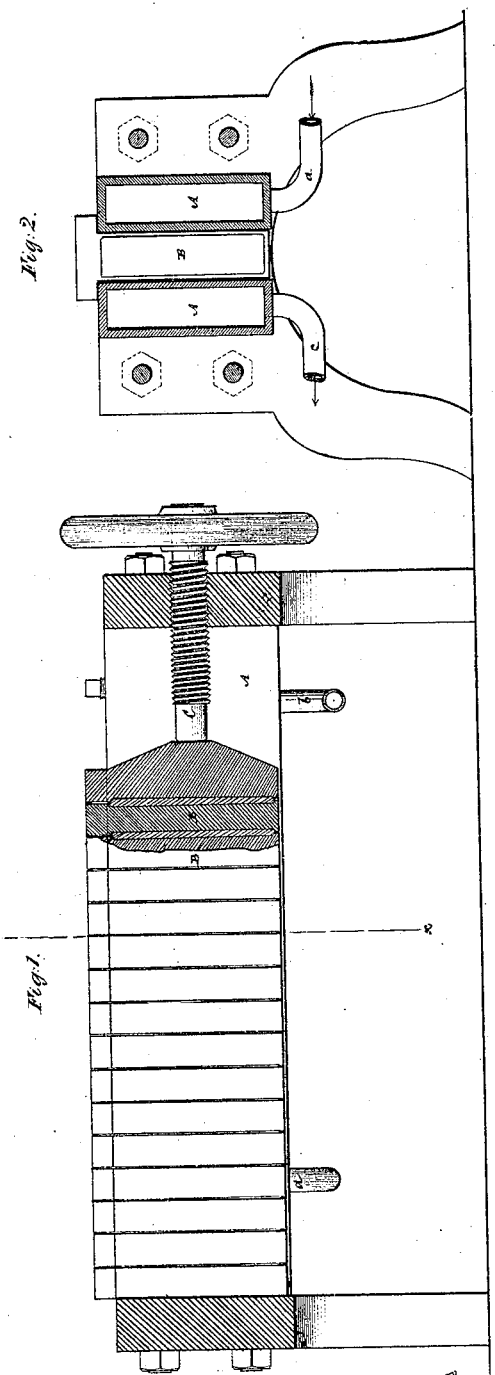

EDWARD F. COFFIN, OF NEWBURYPORT, MASSACHUSETTS.

Letters Patent No. 101,587, dated April 5, 1870

IMPROVEMENT IN MOLDING AND CLARIFYING HORN.

The Schedule referred to in these Letters Patent and making part of the same

To all whom it may concern:

Be it known that I, EDWARD F. COFFIN, of Newburyport, in the county of Essex and State of Massachusetts, have invented a new and useful Improvement in Presses for Molding and Clarifying Horn, of which the following is a full, clear, and exact description, reference being had to the accompanying drawing forming part of this specification, and in which—

Figure 1 represents a longitudinal sectional view of a press constructed in accordance with my improvement; and Figure 2, a transverse section of the same through the line $x\,x$ in fig. 1.

Similar letters of reference indicate corresponding parts.

In presses as heretofore constructed for molding and clarifying horn, as in the manufacture of combs and other articles, the horn has been placed in or between boxes arranged to slide along a suitable frame, and pressure applied to the end one of the series of boxes which have each been made hollow, so as to contain charcoal for heating them by fire. The pressure and the heat combined produce the necessary molding and clarification of the horn. This mode of heating, however, is objectionable, not only as being troublesome and expensive, but on account of the want of uniformity in the separate heating of the boxes by charcoal, which necessarily produces irregularity or defect in the work.

My invention obviates this, and is much more economical and less troublesome, inasmuch as I heat the boxes from the outside, as, for instance, by steam applied to the frame which carries the boxes.

Referring to the accompanying drawing—

A represents the frame of the press, the two sides of which are made hollow, and steam circulated through the same by means of pipes $a$, $b$, and $c$.

B B are the boxes, arranged to slide within and along the frame or case, and made to hold the horn under treatment in between them. These boxes may be made solid, inasmuch as the heat is applied in a uniform manner to the outsides by the steam-heated case.

C is the screw by which the pressure is applied to the heated horn.

A press thus effecting the heating of the horn by steam will prove very advantageous in many respects, but in none more so than in the uniformity of the heating of the several pieces of horn throughout the series of boxes, and in the facility with which the heating temperature may be regulated.

What is here claimed, and desired to be secured by Letters Patent, is—

The boxes B B, heated from their outsides by steam applied to the case A, in which said boxes slide, substantially as specified and for the purposes herein set forth.

EDWARD F. COFFIN.

Witnesses:
JOHN CARR,
EDW. A. HALE.